Patented Aug. 19, 1952

2,607,658

UNITED STATES PATENT OFFICE 2,607,658

ALUMINUM CHLORHYDROXY AND BORATE GELS

Thomas Govett, Summit, and Mildred L. Almquist, Maplewood, N. J., assignors to Reheis Company, Inc., a corporation of New York No Drawing. Application June 27, 1950, Serial No. 170,694

8 Claims. (Cl. 23—14)

This invention relates to a borate gel of low content of boron and of low pH having bactericidal and fungicidal properties.

The gel is particularly useful as an astringent and as a base in cosmetic and pharmaceutical preparations.

The gel utilizes, as one of the components, a chlorhydroxy complex of aluminum, such as described by Govett and De Navarre in the American Perfumer for April 1947. The complex, according to these authors, is "basic aluminum chloride." It may therefore be given the type formula $Al(OH)_x Cl_{3-x}$. The minimum percentages given by the authors for the "white powder" corresponds to slightly more than 2 Al for 1 Cl. A 2:1 ratio would correspond to the empirical formula $Al_2(OH)_5 Cl$. The complexes dissolve in water to give solutions of viscosity varying with the concentration. When it is desired to convert the solutions to creams or pastes, various organic materials are added.

The present invention provides gels of aluminum chlorhydroxy complexes without the use of organic material. It provides also gels that are relatively inexpensive and convenient to prepare, stable, acidic, and variable in viscosity and melting point, from those which are almost flowable liquids up to stiff and apparently solid products.

We have discovered that we may make these gels by the addition of a small proportion of boric acid or borates such as borax to an aluminum chlorhydroxy complex.

Since the boric acid gels are particularly adapted for use as astringents and for like purposes, the invention will be first illustrated by description of the boric acid gels.

We have discovered that, as boric acid is added to an aqueous solution of the aluminum chlorhydroxy complex, the boric acid introduced causes instability. This instability shows itself by hydrolysis resulting in the production of an aluminum compound that is insoluble and precipitates from the solution. We have also discovered that, as the proportion of boric acid is increased somewhat, the hydrolysis that occurs initially does not increase but actually disappears and no precipitate forms. Using approximately 2 to 8 parts of boric acid on the weight of the solution of aluminum chlorhydroxy complex, we make gels that are free from objectionable hydrolysis, are stable on long standing, and have melting points that may be varied with the proportion of boric acid used.

Briefly stated, the invention comprises the herein described gels of boric acid or borates containing at least 1 boron atom to 1 of alkali metal, used in limited proportion, and an aluminum chlorhydroxy complex. The invention comprises also the method of making the gels.

Once there has been discovered the effect of the boric acid or borate added in proper amount, in making a stable gel that is substantially free from hydrolysis, various explanations may be advanced to account for the result. It is considered that the boric acid, for instance, reacts with hydroxyl in the aluminum chlorhydroxy complex. In this action the acid may serve as a polyfunctional reagent, to form a bridge between a number of the original units of the complex. In this way there would result a structure that may be extremely complex and would acocunt for the inertness of the material in hydrolysis reactions and also for the skeletonizing of the gel. In support of the reaction theory, we have observed a slight but measurable evolution of heat in mixing aqueous solutions of boric acid and a chlorhydroxy complex of aluminum even though both of them originally are acidic.

The explanation of the formation of a gel with a small proportion of borax or like borate is considered to be in the formation of a new complex with the original aluminum chlorhydroxy complex. The borax may neutralize one or more hydroxy groups of the complex. In this connection, it is noted that borax may be written as a compound of two metaborate molecules and boric acid anhydride, $B_2O_3$, with water or hydration.

GELS MADE WITH BORIC ACID

To make the boric acid product, mix an aqueous solution of the aluminum chlorhydroxy complex of selected concentration and ratio of aluminum to chlorine with the chosen proportion of boric acid. Before the boric acid is introduced, the solution of the aluminum complex is warmed to a temperature at which the boric acid, once dissolved in the said solution, will not cause setting of the solution to a gel at the said temperature. Until experience with this point is obtained, the solution of the complex originally is heated to advantage to 70° to 90° C. Then the boric acid is stirred in, as in powdered form and about as rapidly as it will dissolve. When the whole of the boric acid has been added, then the warming and stirring are discontinued.

The resulting solution is then combined if desired with additional and conventional ingredients such as perfumes, coloring materials, or active cosmetic or pharmaceutical principles, to make products for the cosmetic or pharmaceutical trade.

As the aluminum chlorhydroxy complex, there is used one of those that is acidic but not too strongly acidic for cosmetic or pharmaceutical work. This means that there must be at least about 5 atomic proportions of aluminum to 3 of chlorine. This means also that, to balance up the valences, there must be present 12 hydroxy groups for 5 atoms of aluminum. When, on the other hand, the ratio of aluminum becomes greater than 7 to 3 of chlorine, the solutions of the chlorhydroxy complex are so viscous as to be unsatisfactory in commercial operations. While we prefer to use the aluminum in the proportion of 5 to 7 atoms to 3 of chlorine, the proportion may be lowered to 4.5 or even 4 Al for certain special uses.

The aluminum chlorhydroxy complexes are available on the market or subject to preparation by known methods.

The proportions of boric acid or borax used to the aluminum chlorhydroxy complex depend in part upon the concentration to which the aluminum chlorhydroxy complex is dissolved in water before being mixed with the boric acid or borax. This concentration, in turn, is varied in accordance with the firmness and melting point desired in the finished gel. We may go as high as 30 parts by weight of the aluminum chlorhydroxy complex containing 6 aluminum atoms to 3 of chlorine, for example, to 70 parts of water, to make 100 parts of the finished solution of the aluminum chlorhydroxy complex. Also we may go as low as 2.5 parts of this complex to 97.5 of water. The greater the viscosity of the selected aluminum chlorhydroxy complex, for a given concentration, the lower is the range of concentration of it in water which is permissible in the original solution for our use. When the ratio of aluminum to chlorine atoms in the complex is as high as 7:3, for example, then the range of concentration 2.5% to 30% given for the 6:3 complex may be shifted to the lower side in this range, with the production of firm gels.

Proportions here and elsewhere herein are expressed as parts by weight except when specifically stated to be atomic, molecular, or equivalent proportions.

More specifically, the proportion of the boric acid to be used must be above that which gives hydrolysis to the extent of causing precipitation and below that which results in crystallization of boric acid in the gel produced after cooling. The proportion may be determined by simple test with any one of the complexes of various ratios of aluminum to chlorine or any concentration of the solution of the complex. The minimum proportion also is ordinarily that required in any event to produce a gel, rather than a solution, or fluid mixture, after mixing and dissolving the boric acid in the aqueous aluminum chlorhydroxy complex. We use about 2.8 to 8 parts by weight of boric acid for 100 parts of the solution of the aluminum chlorhydroxy complex in water, the amount varying somewhat with the concentration of the complex. Thus, we use the boric acid proportions shown in Table 1 for the several concentrations of the aluminum chlorhydroxy complex containing 6 atoms of aluminum to 3 of chlorine. Such a complex contains aluminum equivalent to approximately 47% when calculated as $Al_2O_3$.

TABLE 1

| Grams of Aluminum Chlorhydroxy Complex (6 Al:3 Cl) for 100 grams of Aqueous Solution of Said Complex | Boric Acid, g., Used in Making Gels |
|---|---|
| 30 | 4 to 8. |
| 20 | 3.6 to 8. |
| 10 | 3 to 7. |
| 7.5 | 2.8 to 6. |
| 5 | 2.8 to 6. |
| 2.5 | 5 to 6. |

The concentrations of complex of 5 parts or lower cause the gels to be very slow setting, requiring a day or more to set.

Expressed as molar proportions, the range shown is approximately 0.23–4.1 atoms of boron corresponding to the same number of mols of $H_3BO_3$ for 1 Al. For the 20% solution which we prefer to use, the 3.6 to 8 parts of boric acid correspond to 0.32 to 0.70 mol for 1 atom of aluminum in the gel.

For the concentrations of solutions that are important for commercial uses, namely 10%, 20%, and 30%, the atomic ratios in the final gels are about 5–7Al:3Cl:1.4–7.4B.

The gels are made conveniently by mixing a hot solution of the complex with a hot solution of boric acid, proportions being selected to make the ratios of boric acid to complex and the concentration of the complex that shown in the several tables. At concentrations of 20 parts of the complex or less, the boric acid may be added in solid form.

To show the effect of the Al:Cl ratio on the proportion of boric acid to be used in forming the gels, the 20% concentration of complex has been selected and the ratio of Al:Cl varied, with the results shown in Table 2.

TABLE 2

| Al:Cl Ratio in Complex, all in aqueous solution containing Al equivalent to 9.4 g. $Al_2O_3$ for 100 g. of solution | Boric Acid, g. |
|---|---|
| 7:3 | 2.4 to 6.5. |
| 6:3 | 3.6 to 8. |
| 5:3 | 4 to 8.5. |

Here the ratios are approximately

5–7Al:3Cl:1.3–4.4B

The effect of proportion of boric acid on the melting point of the gels is shown in the Table 3 for an aluminum chlorhydroxy complex of ratio 6Al:3Cl and of 20% concentration of the solution.

TABLE 3

| $H_3BO_3$, g. for 100 g. of the Solution | Approximate Melting Point of Gel Produced |
|---|---|
| | °C. |
| 8 | 65 |
| 4.8 | 40 |
| 4 | 35 |
| 3.6 | 23 |

The gels, on being warmed, soften and then liquefy over a range of several degrees.

BORAX

When borax is the form in which the boron is supplied, the mixing of the borax with the complex is effected as described when boric acid is the boron compound added.

The borax is used in amount adequate to produce a gel but below that amount which if used causes precipitation of a compound of aluminum. Suitable proportions are shown more specifically in Tables 4 and 5.

TABLE 4.—EFFECT OF CONCENTRATIONS OF SOLUTION ON PERMISSIBLE PROPORTION OF BORAX

| Grams of Aluminum Chlorhydroxy Complex (6 Al: 3 Cl) for 100 grams of Aqueous Solution of Said Complex | Borax, g. Used to Produce Gel |
|---|---|
| 30 | Approx. 4.5. |
| 20 | 3.5–5. |
| 7.5 | 2.5–3. |

In the gel, the atomic proportions are approximately 6Al:3Cl:1-3.7B.

TABLE 5.—EFFECT OF Al:Cl RATIO ON PERMISSIBLE PROPORTION OF BORAX

| Al:Cl Ratio in Complex, all in aqueous solution containing Al equivalent to 9.4 g. Al$_2$O$_3$ for 100 g. of solution | Borax, g., Used to Produce Gel |
|---|---|
| 7:3 | Approx. 2. |
| 6:3 | 3.5-5. |
| 5:3 | 3.5-6. |

In the 7:3 compound, the atomic ratios are 7Al:3Cl:0.65B. In general, the borax is used in proportion to supply 1 to 5 boron atoms for 9 of aluminum.

When borax is introduced in proportions substantially above the maximum shown for each concentration of the complex or for each ratio of Al:Cl, the borax causes precipitation of aluminum in the form of an insoluble compound.

In place of borax used herein, there may be used another alkali metal tetraborate, such as potassium or lithium tetraborate in equivalent proportion.

Although boric acid is obviously acidic and borax is alkaline, the addition of either of them to the aluminum chlorhydroxy complex does not alter greatly the original pH. In fact, when added in the amounts shown in the tables, they leave the pH within the favorable range for astringents used as antiperspirants, namely, 3.3 to 4.5. The small effect on pH will be shown by the data of Table 6.

TABLE 6.—EFFECT OF H$_3$BO$_3$ AND BORAX ON pH OF MATERIAL

| Material | pH |
|---|---|
| A. 20% solution of aluminum chlorhydroxy complex (6 Al: 3Cl). | 4.1. |
| A. plus 3.2 g. boric acid for 100 g. of A | 3.6. |
| A. plus 3.0 g. borax for 100 g. of A | 4.2. |

(While the pH varies only moderately with the concentration of the solution, the pH's stated here and elsewhere herein are the pH of the 20% solution of solids in water.)

METABORATE

The boron for making the gel may be supplied in the form of an alkali metal metaborate, as, for example, sodium, potassium, or lithium metaborate, provided the proportion of it is limited to the amount establishing the pH of the whole within the range 3.3 to 4.5, that is, 2 to 3 parts of the metaborate for 100 parts of the solution of the aluminum chlorhydroxy complex. For the 20% solution of the complex of ratio 6Al:3Cl, this corresponds to 2 to 3 grams of the metaborate to 20% of 47% or 9.4 g. of aluminum calculated as Al$_2$O$_3$.

The invention will be further illustrated by description in connection with the following specific examples of the practice of it.

I. Gel made with boric acid powder 200 g. of a basic aluminum chloride complex, having a molecular ratio of 6 Al to 3 Cl and containing aluminum equivalent to 47% Al$_2$O$_3$, is dissolved in 800 g. water.

The solution is then heated to 75° C. and 40 g. boric acid is added gradually, with constant agitation, until it is all dissolved.

The product is filtered hot, to clarify it, and is then poured into a container, where it sets to a gel as it cools.

II. Gel made with boric acid solution 200 g. of a basic aluminum chloride complex, having a molecular ratio of 7 Al to 3 Cl and containing aluminum equivalent to 47% Al$_2$O$_3$, is dissolved in 400 g. water.

60 g. boric acid are dissolved in 400 g. water. Both solutions are heated to 85° C. and mixed.

The product is filtered hot, to produce a clear solution, and is then poured into a container, where it sets to a gel as it cools.

III. Gel made with sodium borate solution 200 g. of basic aluminum chloride complex, having a molecular ratio of 6 Al to 3 Cl and containing aluminum equivalent to 47% Al$_2$O$_3$, is dissolved in 200 g. water.

40 g. of borax (Na$_2$B$_4$O$_7$.10H$_2$O) are dissolved in 600 g. water. The basic aluminum chloride complex solution is heated to 60° C. and maintained at this temperature while the borax solution is added. (The borax solution does not have to be heated first unless the quantity to be used exceeds the saturation proportion for cold water.)

The product is filtered and is then poured into a container, where it sets to a gel as it cools.

IV. Gel made with borax and boric acid 200 g. of a basic aluminum chloride complex, having a molecular ratio of 6 Al to 3 Cl, and containing aluminum equivalent to 47% Al$_2$O$_3$, is dissolved in 550 g. water.

The solution is heated to 50° C. and 20 g. boric acid is dissolved slowly in it, with agitation.

20 g. borax is dissolved in 250 g. water and then added slowly to the mixture, with agitation.

The product is filtered hot and is then poured into a container, where it sets to a gel as it cools.

V. Cream made with borax and aluminum chlorhydroxy complex

| | | |
|---|---|---|
| A | Stearic acid g | 12 |
| | Mineral oil, light g | 2 |
| | Beeswax, white g | 2 |
| | G-2152 (polyoxyethylene glycol stearate) g | 5 |
| | G-2160 (polyoxyethylene propylene glycol palmitate) g | 5 |
| | Titanium dioxide g | 1 |
| B | Water ml | 43 |
| C | Product described in Example III g | 30 |

Heat group of products designated "A" to 80° C. Heat "B" to 85° C. and add to "A" with constant agitation. Cool to 35° C. with constant agitation. Melt "C," then cool to 35° C. and add to the mixture of "A" and "B" with agitation.

This cream takes several days to set properly.

VI. Gel made with metaborate

The metaborate is first dissolved and the solution added slowly to a warm solution of aluminum chlorhydroxide complex. A precipitate forms which slowly redissolves and the limit is reached when the further precipitate fails to dissolve. We found that a mixture represented by 2 grams of the metaborate for 100 grams 20% 6:3 aluminum chlorhydroxide complex remained liquid; with 3 grams the product set, but was the upper limit. Additional metaborate could not be worked into it. The actual process of making this was to take 40 grams of 50% complex (23.5% Al$_2$O$_3$), 6:3 aluminum to chlorine, and add to this 40 grams of water. This was heated to between 60° C. and 70° C. Three grams of sodium metaborate were dissolved in 20 ml. of water and added slowly with constant agitation and sufficient heat to maintain the temperature.

VII. *Cream made with boric acid complex*

| | | |
|---|---|---|
| A | Stearic acid | g 14 |
| | Mineral oil, light | g 2 |
| | Beeswax, white | g 4 |
| | G-2152 | g 5 |
| | G-2160 | g 5 |
| | Titanium dioxide | g 1 |
| B | Water | ml 39 |
| C | Product described in I | g 30 |

Heat group of products designated "A" to 80° C. Heat "B" to 85° C. and add to "A" with constant agitation. Cool to 35° C. with constant agitation. Melt "C," then cool to 35° C. and add to the mixture of "A" and "B" with agitation.

This cream takes several days to set properly.

VIII

A cream is made without using any emulsifier, as follows:

100 g. 20% solution of 6.3 aluminum chlorhydroxy complex with 8 g. boric acid.
18 g. solid petrolatum.

The above materials were melted together and whipped and cooled till set. The product is a good permanent cream.

It will be understood that it is intended to cover all changes and modifications of the examples of the invention herein chosen for the purpose of illustration which do not constitute departures from the spirit and scope of the invention.

What we claim is:

1. In making a gel, the method which comprises mixing an aqueous solution of an aluminum chlorhydroxy complex containing aluminum in the proportion of 5-7 atoms to 3 of chlorine with a boron compound selected from the group consisting of boric acid and alkali metal tetra- and metaborate in the proportion of at least 2 parts by weight of the boron compound for 100 of the said solution but less than the proportion causing solid matter to appear in the solution when cool.

2. In making a gel, the method which comprises warming an aqueous solution of an aluminum chlorhydroxy complex containing 5-7 atoms of aluminum to 3 of chlorine and introducing into and dissolving in the solution boric acid in the proportion of approximately 0.23 to 4.1 mols for 1 atomic proportion of aluminum.

3. In making a gel, the method which comprises warming an aqueous solution of an aluminum chlorhydroxy complex containing 5-7 atoms of aluminum to 3 of chlorine and introducing into and dissolving in the solution borax in the proportion to give approximately 1 to 5 atomic proportions of boron for 9 atomic proportions of aluminum.

4. In making a gel, the method which comprises warming an aqueous solution of an aluminum chlorhydroxy complex containing 5-7 atoms of aluminum to 3 of chlorine and introducing into and dissolving in the solution an alkali metal borate containing at least 1 boron atom to 1 alkali metal atom, the borate being introduced to establish the pH within the range 3.3-4.5.

5. In making a gel, the method which comprises warming an aqueous solution of an aluminum chlorhydroxy complex containing 5-7 atoms of aluminum to 3 of chlorine and introducing into and dissolving in the solution boric acid and an alkali metal borate containing at least 1 boron atom to 1 alkali metal atom, the boric acid and borate being introduced to establish the pH within the range 3.3-4.5.

6. An aqueous aluminum chlorhydroxy and boron compound gel, the boron compound being selected from the group consisting of boric acid, borax, and alkali metal borates containing at least 1 boron atom to 1 alkali metal atom and the several ingredients being present in proportion to establish the following atomic ratios of aluminum, chlorine, and boron: 5-7 Al, 3 Cl, and 0.23-4.1 B.

7. An aqueous aluminum chlorhydroxy and boric acid gel, the several ingredients being present in proportion to establish the following atomic ratios of aluminum, chlorine, and boron: 5-7 Al, 3 Cl, and 0.23-4.1 B.

8. An aqueous aluminum chlorhydroxy and borax gel, the several ingredients being present in proportion to establish the following atomic ratios of aluminum, chlorine, and boron: 5-7 Al, 3 Cl, and 0.65-3.7 B.

THOMAS GOVETT.
MILDRED L. ALMQUIST.

No references cited.